Dec. 16, 1969 M. A. VENETOS ET AL 3,483,759
VELOCITY TRANSDUCER
Filed Jan. 19, 1968
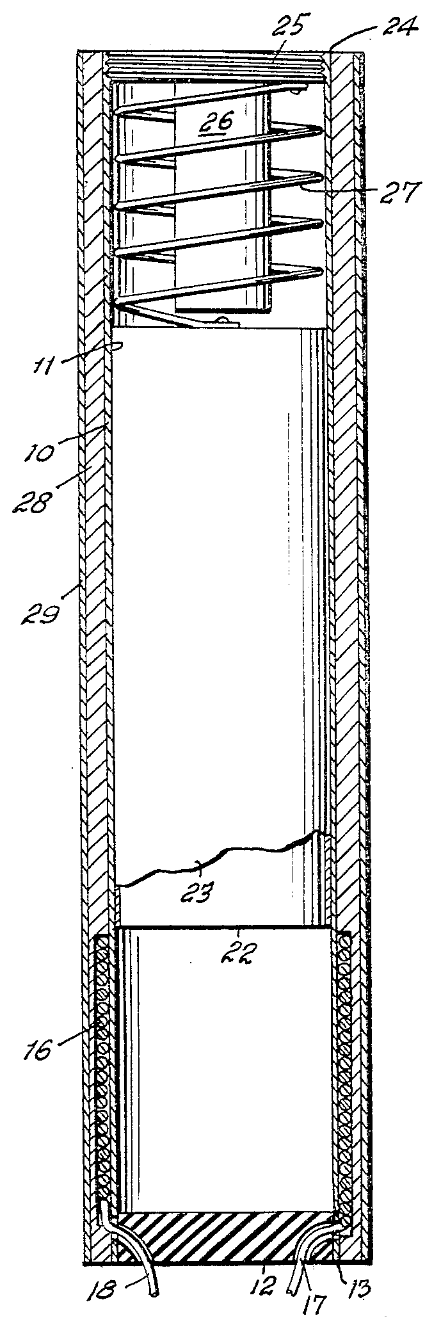
INVENTORS
Matthew A. Venetos
Denis J. O'Sullivan, Jr.
BY: Harry M. Saragovitz,
Edward J. Kelly &
R. P. Gibson
ATTORNEYS.

United States Patent Office 3,483,759
Patented Dec. 16, 1969

3,483,759

VELOCITY TRANSDUCER

Matthew A. Venetos and Denis J. O'Sullivan, Jr., Natick, Mass., assignors to the United States of America as represented by the Secretary of the Army Filed Jan. 19, 1968, Ser. No. 699,216
Int. Cl. G01p *15/08*
U.S. Cl. 73—517 1 Claim

ABSTRACT OF THE DISCLOSURE

A velocity transducer for producing a measurable indication of shock experienced by a container in which it is mounted consisting of a cylindrical rod magnet suspended by a spring within a tube having a winding positioned thereon in such a manner that the movement of the magnet within the tube induces a voltage in the winding proportional to the impact velocity.

The invention described herein may be manufactured, used, and licensed by or for the Government for governmental purposes without the payment to us of any royalty thereon.

One of the major problems in the development of effective packaging and container systems is the lack of reliable information on conditions encountered by supplies during shipment, handling and storage. Container design in the past has been chiefly based on observations and experience gained over a long period of time on the actual field of performance of many types of containers of varied size and construction. Past experience has shown that the shock environment produced during handling of containers is an important factor. Therefore, a knowledge of the impact velocity that a container experiences in such environment is useful in the design of protective cushioning. To obtain such data it is necessary to utilize transducer means coupled to recording means both mounted within a container whereby impact velocities experienced by the container is represented by electrical signals proportioned to such velocities.

Accordingly, an object of the invention is a new and novel electromagnetic velocity transducer.

Another object of the invention is a sliding magnetic rod velocity transducer which produces reliable signal output in response to velocity components of angular impacts parallel to the sensitive axis of the transducer.

The invention will be more fully understood and its objects and advantages further appreciated by referring now to the detailed description taken in conjunction with the accompanying drawing.

With reference to the sole figure in the drawing, 10 indicates an aluminum tube having a highly polished interior surface 11. A disk-shaped bumper pad 12 of non-magnetic material is fitted into end 13 of aluminum tube 10 forming a closure therefor. Magnet wire coil 16 is wound on aluminum tube 10 adjacent end 13. Leads 17 and 18 of coil 16 are threaded through aluminum tube 10 and bumper pad 12 to the exterior of bumper pad 12 to form means for coupling the signal output of the velocity transducer to recording means. A cylindrical magnet 22 provided with a Teflon tube 23 along its length is positioned in aluminum tube 10 and dimensioned to have a smooth sliding fit therewith, resulting in a low coefficient of friction and a more accurate velocity measurement.

A tight fit between cylindrical magnet 22 and Teflon tube 23 is obtained by heat shrinking Teflon tube 23 around the cylindrical magnet 22. End 24 of aluminum tube 10 has a non-magnetic closure 25 fitted therein and formed with an interiorly extending cylindrical member comprising bumper stop 26 for limiting the travel of cylindrical magnet 22 as does bumper pad 12 also. A non-magnetic tension spring 27 concentric with bumper stop 26 has one end fastened to closure 25 and its outer end to cylindrical magnet 22 and biases the cylindrical magnet 22 towards the bumper stop 26. The velocity transducer assembly as described in the foregoing is then mounted in a potting compound 28 surrounded by a soft iron tube 29 which provides magnetic shielding.

In practicing the invention, the velocity transducer is fixed in the interior of the container which when dropped causes the spring loaded cylindrical magnet to travel down the tube thereby inducing a voltage in the coil which is proportional to the impact velocity. This voltage is conducted by leads 17 and 18 to a suitable recording means. The bumper pad and bumper stop absorb the impact energy of the cylindrical magnet and prevent over-extension or compression of the tension spring. It will be apparent that a suitable non-magnet compression spring could be used in lieu of tension spring 27 shown, in which case the compression spring and a bumper stop of suitable length would be located in the opposite end of the tube 10, i.e. end 13 within the magnet wire coil 16. In actual practice diametrically opposed pairs of the velocity transducers are positioned in the X, Y and Z axes of the container in order to measure impact from any direction.

Although a specific embodiment of the invention has been illustrated and described, it will be understood that this is but illustrative and that various modifications may be made therein without departing from the spirit of the invention and the scope of the appended claim.

We claim:

1. An electromagnetic transducer adapted to be installed in a container for generating a voltage proportional to the impact velocity of the container comprising, an aluminum tube having a highly polished interior surface, a disk closure of non-magnetic material comprising a bumper pad affixed in one end of said aluminum tube, a non-magnetic closure means affixed in the other end of said aluminum tube and formed with a bumper stop comprising a reduced cylindrical extension of said closure means directed interiorly of the aluminum tube, an electromagnetic winding on said aluminum tube adjacent the end provided with the disk closure having leads extending exteriorly of the disk closure, a cylindrical permanent magnet arranged for longitudinal movement in said aluminum tube, a Teflon coating on the peripheral surface of said magnet whereby friction between said magnet and said tube is minimized, means for biasing the cylindrical permanent magnet toward the non-magnetic closure means comprising a non-magnetic tension spring concentric with said reduced cylindrical extension and having one end affixed to said non-magnetic closure means and another end affixed to the end of said magnet adjacent said reduced cylindrical extension, a layer of potting compound on the exterior of said aluminum including the electromagnetic winding, and magnetic shielding means for said electromagnetic transducer comprising a soft iron tube embracing said compound and extending the length of said aluminum tube, the cylindrical permanent magnet sliding in the aluminum tube when the container is subjected to impact to generate a voltage in the electromagnetic winding.

(References on following page)

References Cited

UNITED STATES PATENTS

| | | | |
|---|---|---|---|
| 2,469,137 | 5/1949 | Strong | 73—71.2 |
| 2,764,019 | 9/1956 | Lindholm et al. | 73—71.2 |
| 2,944,804 | 7/1960 | Persson et al. | 73—517 |
| 3,100,292 | 8/1963 | Warner et al. | 73—517 |
| 3,129,347 | 4/1964 | Tognola | 73—71.2 |
| 3,403,547 | 10/1968 | Schwartz | 73—71.2 |

JAMES J. GILL, Primary Examiner

H. GOLDSTEIN, Assistant Examiner